June 20, 1961  H. J. VANSTROM  2,988,861
WORK-HOLDING FIXTURE
Filed April 22, 1959
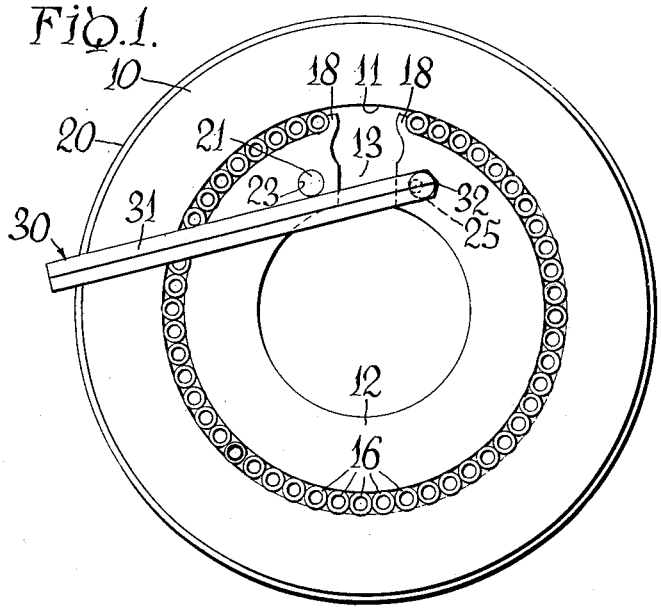
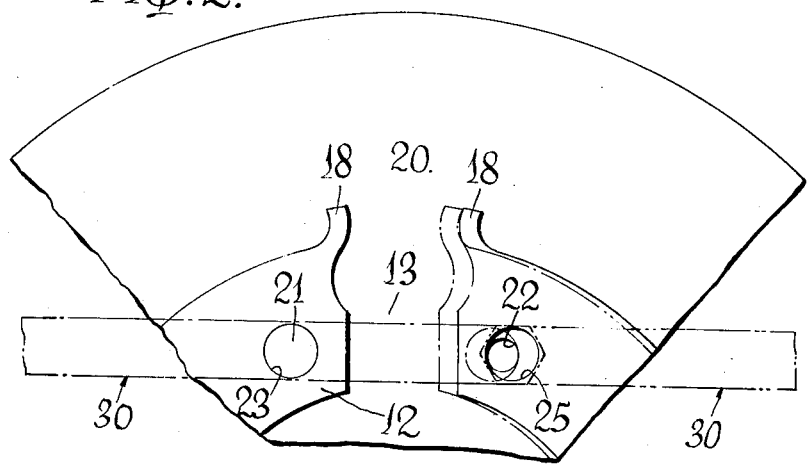
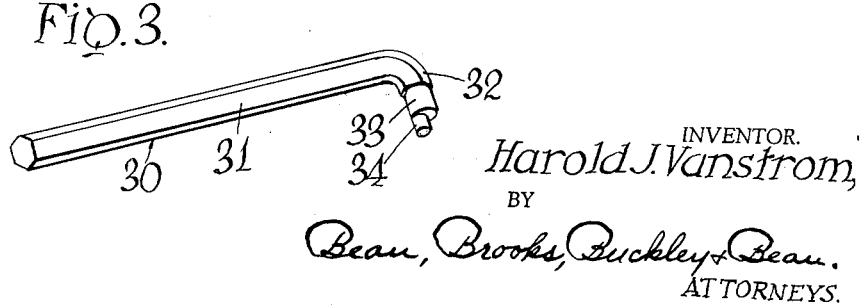
INVENTOR.
Harold J. Vanstrom,
BY
Bean, Brooks, Buckley & Bean.
ATTORNEYS.

United States Patent Office 2,988,861
Patented June 20, 1961

2,988,861
WORK-HOLDING FIXTURE
Harold J. Vanstrom, P.O. Box 111, Bemus Point, N.Y.
Filed Apr. 22, 1959, Ser. No. 808,246
7 Claims. (Cl. 51—217)

This invention relates to work holding devices and more particularly to a novel fixture for holding a plurality of duplicate objects or workpieces in accurate relative positions for performing abrading or other machining or finishing operations thereon or for other similar purposes.

In grinding corresponding surface portions of relatively small workpieces, particularly in mass production or when a multiplicity of pieces must be similarly ground or otherwise machined or finished, a difficult problem is presented in properly positioning the workpieces for such grinding or machining. Typical cases in point are small bushings, ball bearing and roller bearing races, and similar small cylindrical parts, although the work holding fixture of the present invention may be advantageously employed for many similar purposes wherever cylindrical or partly cylindrical or similar workpieces are to be held for the purpose of grinding one or both of their end or radial faces, or otherwise machining, fabricating or treating such end faces.

In the instance set forth herein by way of example the cylindrical workpieces, prior to the end face grinding contemplated in the method of the present invention and involving the employment of the fixture of the present invention, preferably have their peripheries accurately ground to precise dimensions.

While the work holding fixture of the present invention is applicable wherever the advantages inherent in the device make its use advisable, reference will be had in the following specification to its use in holding a plurality of cylindrical workpieces in proper alignment on the magnetic chuck work-receiving table of a conventional surface grinder, to present the workpieces in such position that the radial end faces of a considerable number of the workpieces may be simultaneously ground.

While a single complete specific embodiment of the principles of the present invention, both as to construction of the fixture itself and as to its mode of environment and use, is set forth in detail in the following specification and is illustrated in the accompanying drawing, it is to be understood that the invention is not limited to the details shown and that certain variations in the construction of the fixture and its mode of use may be made without departing from the spirit of the invention, the scope of which is limited only as defined in the appended claims.

In the drawing:

FIG. 1 is a top plan view of one form of the fixture of the present invention disposed upon a plate employed in loading and unloading the same with workpieces;

FIG. 2 is a fragmentary enlarged view showing the relationship of apertures in the fixture and the plate which are employed in the loading and unloading operations; and FIG. 3 is a perspective view of a special wrench member which is used in the aforesaid loading and unloading operations in the form of fixture illustrated herein by way of example.

In the drawing, like characters of reference denote like parts and, referring particularly to FIG. 1, the fixture of the present invention comprises essentially an annular member 10 having a circular central opening 11, the walls of which are preferably precision ground to be precisely at right angles to the axis of the annulus and of an accurately maintained predetermined diameter, and a central cooperating locking member 12. The locking member 12 is likewise of generally annular form but is split as at 13 to enable the same to be contracted in a diametral direction for loading and unloading the fixture, in a manner which will presently appear. It is to be understood that the annular member 10 and locking member 12 are preferably of the same thickness, such thickness being less than the height of the finished workpieces.

In the form set forth herein by way of example the workpieces, designated 16, comprise small annular or hollow cylindrical members. In the present instance the outside diameter of the locking member 12 when the same is in a free unflexed condition is several thousandths of an inch greater than the dimensions obtained by subtracting twice the diameter of a workpiece from the inside diameter of the annular member 10. Accordingly, the workpieces 16 will be resiliently held between the inner periphery of the annular member 10 and the outer periphery of the locking member 12 when the fixture is loaded.

Adjacent to the opening 13 in the split annular locking member 12 the latter is provided with radially projecting lugs or ears 18 which define an arcuate workpiece-receiving channel extending about the locking member 12 between the ears 18. The length of this channel, when the locknig member 12 is in a free and unflexed condition, is slightly less than the sum of the diameters of the number of workpieces which the fixture is designed to accommodate. From this it will be seen that the workpieces in the fixture, when the latter is loaded, will in addition to the outward resilient pressing force of the periphery of the locking member 12, be subjected to the arcuate pressing force of the ears 18 against the end workpieces 16 of the arcuate row thereof which lies between the inner periphery of the annular member 10 and the outer periphery of the locking member 12.

In FIG. 1 the numeral 20 designates a plate member which is employed in loading and unloading the fixture and plate 20 is provided with an upwardly projecting pin 21 and, at a predetermined distance therefrom, with an aperture 22 as best shown in FIG. 2. Locking member 12 has an aperture 23 adapted to fit over pin 21 and, at the opposite side of the split opening 13 thereof, is provided with a further aperture 25 which is in general registry with the aperture 23 in plate 20 and is substantially larger than aperture 22. When the locking member 12 is in a relatively free expanded condition the center to center distance between the apertures 23 and 25 is slightly greater than the center to center distance between the pin 21 and aperture 22 of plate member 20, as will appear from a consideration of FIG. 2.

A special wrench member for contracting the locking member 12 is shown in FIG. 3 and is of the general type known to mechanics as an Allen wrench. This wrench is designated generally by the numeral 30 and comprises a handle portion 31 and a working end portion 32 at right angles thereto. The end portion 32 comprises a cylindrical portion 33 and a reduced end portion 34 which is eccentric with respect to the cylindrical portion 33.

The portions 33 and 34 may be slightly tapered or rounded to permit easy entry into the openings 22 and 25 of plate member 20 and locking member 12, respectively, and it will be noted that the eccentricity of the portions 33 and 34 of the wrench approximate the eccentricity of the openings 22 and 25 so that the end 32 of the wrench may readily be inserted jointly in these openings. With the wrench 30 constructed as shown, the end thereof is inserted in the openings 22 and 25 with the handle of the wrench handle 31 extending generally to the left, as viewed in FIGS. 1 and 2, from the openings 22 and 25.

Thereupon, rotation of the wrench in either direction will draw the right hand portion of the locking member 12 toward the left hand portion, as viewed in the drawing, through camming action of the cylindrical portion 33 against the opening 25. If the wrench is rotated approximately 180 degrees to an opposite generally dead center position, whereupon it will project to the right from the openings, the parts will remain in this position with the locking member contracted, until the wrench is again rotated to initial position for expanding the locking member 12 or, more correctly, to permit the locking member to expand under its own resilience.

When the locking member is contracted as explained in the preceding paragraph the radial space between the annular member 10 and the locking member 12 is slightly greater than the diameters of the workpieces 16 and the arcuate circumferential space between the ears 18, measured along the aforesaid radial space, is slightly greater than the sum of the diameters of the number of workpieces which the fixture is designed to receive. Ideally, the circumferential clearance will be $\pi$ times the radial clearance, so that if the radial clearance is .003" the circumferential clearance will be about .010".

With the locking member contracted the proper number of workpieces is placed in the space thus provided therefor and the wrench 30 is rotated to initial position to permit the locking member 12 to engage resiliently against the arcuate row of workpieces, both radially outwardly and arcuately against the end workpieces of the arcuate row, whereupon the wrench is removed. The loaded fixture may then be picked up from plate member 20 with the workpieces resiliently but securely retained therein, it being understood that the upper faces of the workpieces project upwardly from the upper surfaces of the members 10 and 12 of the fixture, so that the loaded fixture may be placed on the magnetic chuck of a grinder, for instance, and the upper faces of all of the workpieces may be simultaneously ground.

When the faces have thus been finished, the workpieces are removed from the fixture by placing the latter on the plate member 20 and employing the wrench 30 in substantially the same manner as in loading the fixture. The openings 23 and 25 of the locking member 12 are preferably identical so that the fixture may be placed upon plate member 12 in an upside down position from that shown in the drawing and described above, in which position the openings 23 and 25 are reversed. Therefore, if it be desired to grind both ends of the workpieces 16, after the first ends have been ground as described above, the fixture is placed on plate member 12 with the finished ends down, upon which the annular member 10 and locking member 12 will be held slightly above plate member 20 by the workpieces.

Thereupon, when the locking member 12 is contracted by use of the wrench 30, the annular member 10 and locking member 12 will drop to the plate member 20, leaving the unground or unfinished ends of the workpieces projecting thereabove, whereupon the wrench 30 is released, locking member 12 again expands, and the second ends of the workpieces are ready to be ground.

I claim:

1. A fixture for holding a plurality of like workpieces with their end faces in substantially common planes comprising an annular holder for receiving a generally arcuately extending row of workpieces with each workpiece disposed against the inner periphery of said annular holder and with each of the workpieces in abutment with adjacent workpieces, and a resilient locking member comprising a radially split annulus of a free diameter greater than the inside diameter of said arcuate row of workpieces and adapted to be disposed within said annular holder to engage radially outwardly against said workpieces and hold the same resiliently against said annular holder, said locking member having radial projections adjacent the split therein adapted to engage resiliently against the end workpieces of said arcuate row, and means for contracting said split annulus locking member to enlarge the radial space between the same and said annular holder and to enlarge the arcuate space for receiving said row of workpieces between said radial projections to permit introduction of workpieces to said fixture or removal of the same therefrom.

2. A fixture for holding a plurality of like workpieces with their end faces in substantially common planes comprising a holder having a circular opening for receiving a generally arcuately extending row of workpieces with each workpiece disposed against the wall of said opening and with each of the workpieces in abutment with adjacent workpieces, and a resilient locking member comprising a radially split annulus of a free diameter greater than the inside diameter of said arcuate row of workpieces and adapted to be disposed within said holder to engage radially outwardly against said workpieces and hold the same resiliently against the wall of said opening, said locking member having radial projections adjacent to the split therein adapted to engage resiliently against the end workpieces of said arcuate row, and means for contracting said split annulus locking member to enlarge the radial space between the same and said holder and to enlarge the arcuate space for receiving said row of workpieces between said radial projections to permit introduction of workpieces to said fixture or removal of the same therefrom.

3. A fixture for holding a plurality of like workpieces with their end faces in substantially common planes comprising an annular holder for receiving a generally arcuately extending row of workpieces with each workpiece disposed against the inner periphery of said annular holder and with each of the workpieces in abutment with adjacent workpieces, and a resilient locking member comprising a radially split annulus adapted to expand in a radially outward direction against said workpieces and hold the same against said holder and adapted to contract in a radially inward direction away from said workpieces to release the same, said annulus being resiliently biased in one of said directions, and means for positively moving said annulus in the other of said directions against said resilient bias, said locking member having radial projections adjacent to the split therein adapted to engage resiliently against the end workpieces of said arcuate row.

4. A fixture for holding a plurality of like workpieces with their end faces in substantially common planes comprising an annular holder for receiving a generally arcuately extending row of workpieces with each workpiece disposed against the inner periphery of said annular holder and with each of the workpieces in abutment with adjacent workpieces, and a resilient locking member comprising a radially split annulus of a free diameter greater than the inside diameter of said arcuate row of workpieces and adapted to be disposed within said annular holder to engage radially outwardly against said workpieces and hold the same resiliently against said annular holder, said locking member having a pair of openings at opposite sides of the split portion thereof, and means cooperating with said fixture for contracting said locking member and holding the same in contracted position for loading and unloading the fixture, said means comprising a plate member for receiving said fixture flatwise, a pin projecting from said plate through one of said locking member openings, and an opening in said plate eccentric with respect to the other of said pair of locking member openings but in general registry therewith, and eccentric pin means engageable in said eccentric openings and rotatable to contract said locking member.

5. A fixture for holding a plurality of like workpieces with their end faces in substantially common planes comprising a holder having a circular opening for receiving a generally arcuately extending row of workpieces with each workpiece disposed against the wall of said opening and with each of the workpieces in abutment with adjacent workpieces, and a resilient locking member comprising a radially split annulus of a free diameter greater than the inside diameter of said arcuate row of workpieces and adapted to be disposed within said annular holder to engage radially outwardly against said workpieces and hold the same resiliently against the wall of said opening, said locking member having radial projections adjacent to the split therein adapted to engage resiliently against the end workpieces of said arcuate row, said locking member having a pair of openings at opposite sides of the split portion thereof, and means cooperating with said fixture for contracting said locking member and holding the same in contracted position for loading and unloading the fixture, said means comprising a plate member for receiving said fixture flatwise, a pin projecting from said plate through one of said locking member openings, and an opening in said plate eccentric with respect to the other of said pair of locking member openings but in general registry therewith, and eccentric pin means engageable in said eccentric openings and rotatable to contract said locking member.

6. A fixture for holding a plurality of like workpieces with their end faces in substantially common planes comprising an annular holder for receiving a generally arcuately extending row of workpieces with each workpiece disposed against the inner periphery of said annular holder and with each of the workpieces in abutment with adjacent workpieces, and a resilient locking member comprising a radially split annulus adapted to expand in a radially outward direction against said workpieces and hold the same against said holder and adapted to contract in a radially inward direction away from said workpieces to release the same, said locking member being resiliently biased in one of said directions, said locking member having a pair of openings at opposite sides of the split portion thereof, and means cooperating with said fixture for positively moving said locking member and holding the same in the opposite direction against said resilient bias, said means comprising a plate member for receiving said fixture flatwise, a pin projecting from said plate through one of said locking member openings, and an opening in said plate eccentric with respect to the other of said pair of locking member openings but in general registry therewith, and eccentric pin means engageable in said eccentric openings and rotatable to thus move said locking member.

7. A fixture for holding a plurality of like workpieces with their end faces in substantially common planes comprising an annular holder for receiving a generally arcuately extending row of workpieces with each workpiece disposed against the inner periphery of said annular holder and with each of the workpieces in abutment with adjacent workpieces, and a resilient locking member comprising a radially split annulus adapted to expand in a radially outward direction against said workpieces and hold the same against said holder and adapted to contract in a radially inward direction away from said workpieces to release the same, said locking member being resiliently biased in one of said directions, said locking member having a pair of openings at opposite sides of the split portion thereof, and means cooperating with said fixture for positively moving said locking member and holding the same in the opposite direction against said resilient bias, said means comprising a plate member for receiving said fixture flatwise, a pin projecting from said plate through one of said locking member openings, and an opening in said plate eccentric with respect to the other of said pair of locking member openings but in general registry therewith, and eccentric pin means engageable in said eccentric openings and rotatable to thus move said locking member, said locking member having radial projections adjacent to the split therein adapted to engage resiliently against the end workpieces of said arcuate row.

References Cited in the file of this patent

UNITED STATES PATENTS

| | | |
|---|---|---|
| 2,483,697 | Giles | Oct. 4, 1949 |
| 2,695,481 | Vanstrom | Nov. 30, 1954 |
| 2,720,065 | Vanstrom | Oct. 11, 1955 |
| 2,720,066 | Vanstrom | Oct. 11, 1955 |